United States Patent [19]

Tashima

[11] Patent Number: 5,897,653
[45] Date of Patent: Apr. 27, 1999

[54] DATA TRACING APPARATUS

[75] Inventor: Naohisa Tashima, Hyogo, Japan

[73] Assignees: Mitsubishi Electric Semiconductor Software, Hyogo; Mitsubishi Denki Kabushiki Kaisha, Tokyo, both of Japan

[21] Appl. No.: 08/767,925

[22] Filed: Dec. 17, 1996

[30] Foreign Application Priority Data

Jun. 20, 1996 [JP] Japan .................................. 8-159932

[51] Int. Cl.⁶ .................................................. G06F 12/00
[52] U.S. Cl. ..................... 711/106; 395/800.23; 395/500; 395/183.01; 365/189.12; 365/189.05; 324/73.1; 364/490
[58] Field of Search ....................... 711/106; 395/800.23, 395/500, 183.01; 365/189.05, 189.12; 364/490; 324/73.1

[56] References Cited

U.S. PATENT DOCUMENTS 4,884,191  11/1989  Weatherford et al. ................... 711/106
5,235,691  8/1993  Hirosawa ................................. 711/106
5,319,597  6/1994  Adachi ................................ 365/189.05
5,715,200  2/1998  Fielder et al. ...................... 365/189.12

FOREIGN PATENT DOCUMENTS

63-269393  11/1988  Japan .
4195372  7/1992  Japan .

*Primary Examiner*—Tod R. Swann
*Assistant Examiner*—Nasser Moazzami
*Attorney, Agent, or Firm*—Leydig, Voit & Mayer

[57] ABSTRACT

A data tracing apparatus includes a data storing unit having a first area and a second area, for storing data corresponding to a predetermined number of bus cycles, a data writing/reading controlling unit for writing data alternatively to the first area and the second area for each of the predetermined number of bus cycles and for reading data stored in an area which is not subject to writing and within first area and the second area, reading being faster than writing, a dynamic memory for successively storing data read from the data storing unit by the data writing/reading controlling unit, and a refreshing unit for refreshing the dynamic memory after reading by the data writing/reading controlling unit.

5 Claims, 5 Drawing Sheets

DATA TRACING APPARATUS

BACKGROUND OF THE INVENTION

1. Field of the Invention

This invention is concerned with an in-circuit emulator, and especially relates to a data tracing apparatus used in an in-circuit emulator.

2. Description of the Related Art

An in-circuit emulator is used for developing programs of a system which includes a microcomputer. Such an emulator has a data tracing function to store data history of signals on the data bus for a predetermined period of time. Debugging of programs is performed with reference to the data history.

Figure 5:
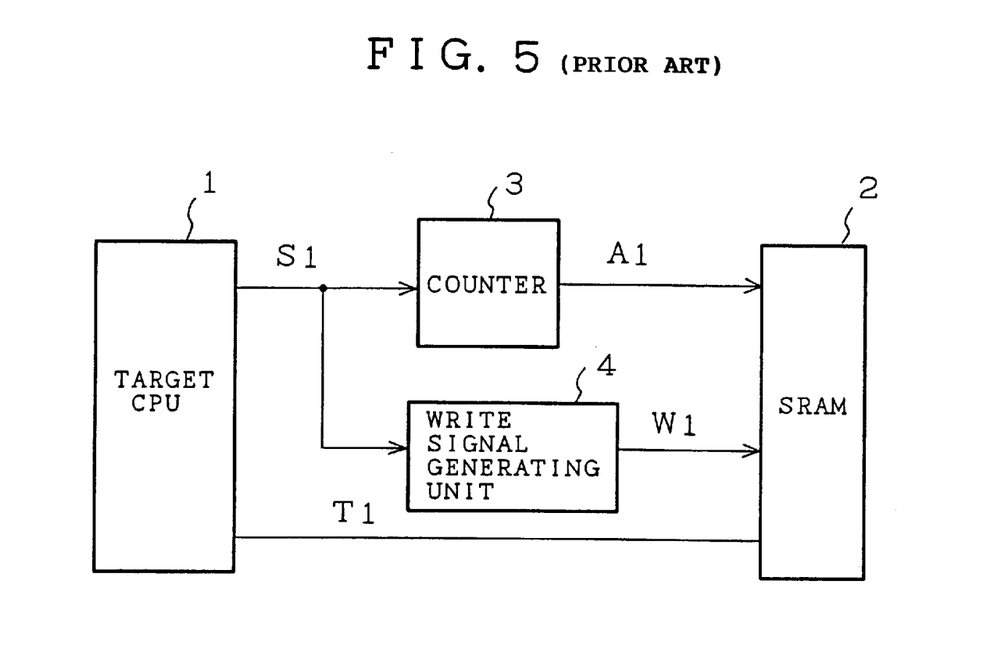
FIG. 5 is a block diagram showing the configuration of the trace function unit of the conventional in-circuit emulator.

FIG. 5 is a block diagram showing the configuration of the trace function unit of a conventional in-circuit emulator. In this figure, reference numeral 1 denotes a target Central Processing Unit (CPU) to be subjected to program developing, 2 denotes a Static Random Access Memory (SRAM) for storing traced data of the bus signals of the target CPU 1, 3 denotes a counter which produces addresses for making access to the SRAM 2 based on strobe signal S1 output from the target CPU, 4 denotes a write signal generating unit which generates write signal W1 for writing data to SRAM 2 based on strobe signal S1 output from the target CPU 1.

Figure 6:
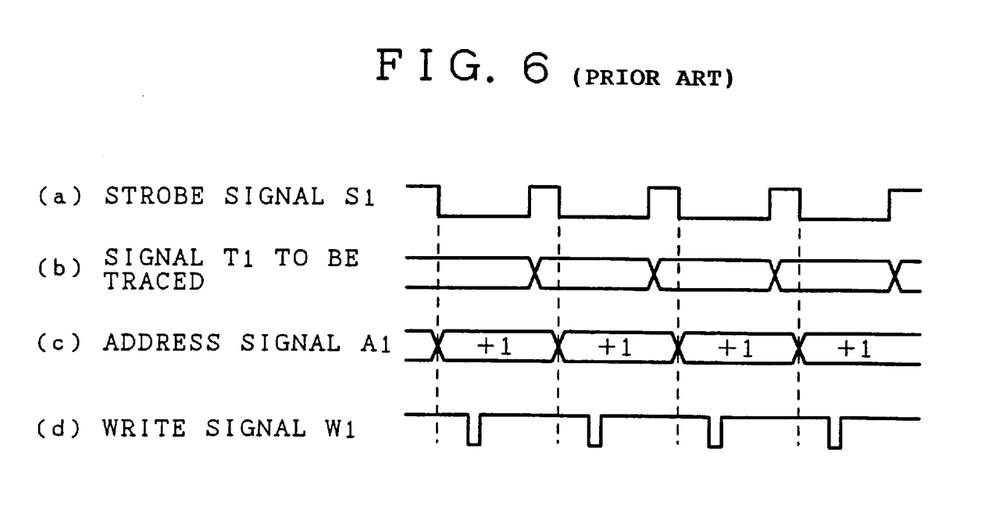
FIG. 6 is a timing chart showing timings of the signals in the in-circuit emulator indicated in FIG. 5.

FIG. 6 is a timing chart showing timings of the signals in the in-circuit emulator indicated in FIG. 5. In FIG. 6, reference (a) shows timing of the strobe signal S1 output from the target CPU 1 by each bus cycle, reference (b) shows timing of signal T1 to be traced such as signals on the bus of the target CPU 1 and control signals, reference (c) shows timing of address signal A1 output from counter 3 for making access to the SRAM 2, reference (d) shows timing of write signal W1 output from the write signal generating unit 4.

The target CPU 1 performs operations to memories and I/O devices by bus cycles in order to deal with a user program which is the subject of debugging. The target CPU 1 recognizes the bus cycle operations by monitoring strobe signal S1. Namely, the target CPU 1 recognizes that a bus cycle operation is performed each time strobe signal S1 becomes active. In the above configuration, the strobe signal S1 is designed to be low-active.

Strobe signal S1 output from the target CPU 1 is input to the counter 3 and the write signal generating unit 4. The counter 3 increments address signal A1 and outputs it at a trailing edge of the strobe signal S1. Namely, address signal A1 is incremented each time a bus cycle operation is performed by the target CPU 1 and address signal A1 is provided to the SRAM 2. On the other hand, the write signal generating unit 4 generates write signal W1 for writing data to the SRAM 2 based on strobe signal S1 and outputs write signal W1 to the SRAM 2. Signals indicative of the status of the target CPU 1 including address bus signals, data bus signals, and other control signals are provided to the data signal input terminal of the SRAM 2 as signals T1 to be traced. Therefore, the signals T1 to be traced are stored in the SRAM 2 successively.

The conventional in-circuit emulator is configured as explained above and it is necessary for such an emulator to include a SRAM with a large capacity, which leads to a high cost and a large size of the apparatus.

SUMMARY OF THE INVENTION

This invention is accomplished in view of the above. Accordingly, the object of the invention is to provide a data tracing apparatus which performs a data tracing function in a small sized apparatus at a lower cost.

A data tracing apparatus according to an embodiment of this invention comprises: data storing means having a first area and a second area for storing the data corresponding to a predetermined number of bus cycles; data writing/reading controlling means for writing data alternatively to the first area and the second area for each of the predetermined number of bus cycles and for reading data stored in an area not subject to writing within the first area and the second area, the reading being faster than the writing; a dynamic memory for successively storing data read from the data storing means by the data writing/reading controlling means; and refreshing means for refreshing the dynamic memory after the data writing/reading controlling means performs reading. With this configuration, a dynamic memory which is cheaper and smaller may be used for storing data to be traced, and the apparatus can be produced in a smaller size at a lower cost.

Further, in the data tracing apparatus of this embodiment, the data storing means has a first memory corresponding to the first area and a second memory corresponding to the second area and the data writing/reading controlling means has a selector, receiving an output signal from the first memory and an output signal from the second memory, for selecting the output signal from the first memory and second memory and for outputting the selected signal to the dynamic memory subject to reading. With this configuration, two small capacity memories may be used as temporary data storage means, and data of a signal to be traced may be stored in a dynamic memory.

Furthermore, in a data tracing apparatus of this embodiment, the first memory and the second memory each comprise a static memory. With this configuration, two small capacity static memories may be used as temporary data storage means to allow data of a signal to be traced to be stored in a dynamic memory.

Still further, a data tracing apparatus another embodiment of this invention comprises: a first in first out memory for storing data; data writing/reading controlling means for writing data to the first in first out memory and for reading, for each predetermined number of bus cycles, data corresponding to the predetermined number of bus cycles stored in the first in first out memory, reading being faster than writing; a dynamic memory for successively storing data read from the first in first out memory by the data writing/reading controlling means; and refreshing means for refreshing the dynamic memory after the data writing/reading controlling means performs reading. With this configuration, a dynamic memory which is cheaper and smaller may be used for storing data to be traced, and the apparatus can be produced in a smaller size at a lower cost.

DETAILED DESCRIPTION OF THE PREFERRED EMBODIMENTS

The preferred embodiments of the present invention are explained hereinafter in detail with reference to the drawings.

EMBODIMENT 1

Figure 1:
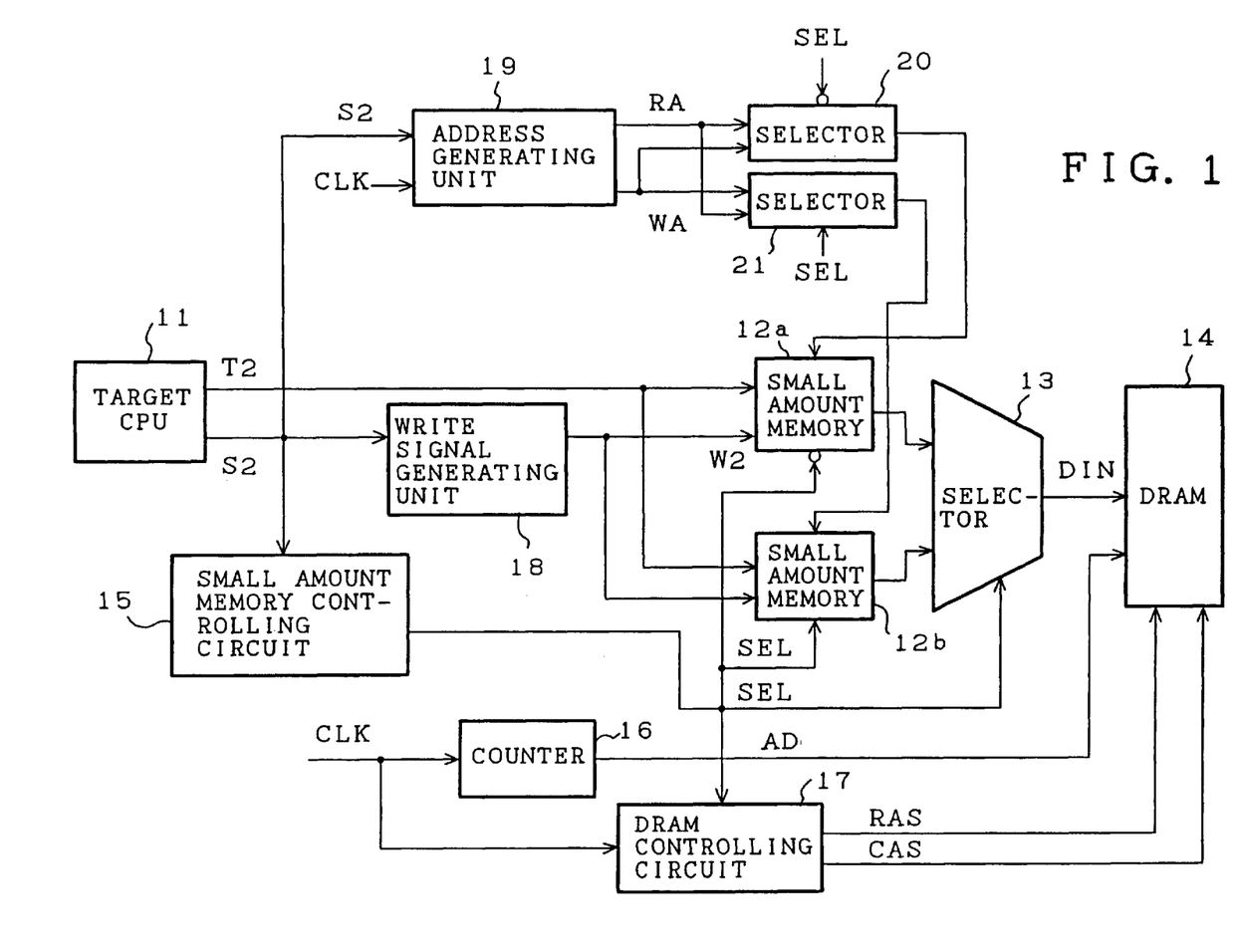
FIG. 1 is a block diagram showing the configuration of the data tracing apparatus of the first embodiment of the present invention.

FIG. 1 is a block diagram showing the configuration of the data tracing apparatus of the first embodiment of the present invention. In FIG. 1, reference numeral 11 denotes a target Central Processing Unit (CPU) of a system to be debugged, reference numeral 12a, 12b denote a small amount memory for storing data of the signal T2 to be traced including bus signals and control signals of the target CPU 11 for the period of n bus cycles (n is a natural number), reference numeral 13 denotes a selector for selecting data output from the small amount memories 12a, 12b, reference numeral 14 denotes a Dynamic Random Access Memory (DRAM) for storing data to be traced concerning the target CPU 11, reference numeral 15 denotes a small amount memory controlling circuit which controls the operations of data write/read to and from the small amount memories 12a, 12b, reference numeral 16 denotes a counter which generates an address signal for the DRAM 14 during the tracing operation to the target CPU 11, reference numeral 17 denotes a DRAM controlling circuit which controls writing operation of the data of DRAM input signal DIN to the DRAM 14 and refreshing operation, reference numeral 18 denotes a write signal generating circuit which generates write signal W2 based on strobe signal S2 output from the target CPU 11 for writing operation of data to the DRAM 14. The small amount memories 12a, 12b may comprise a static memory or flip-flops.

Reference numeral 19 denotes an address generating unit for generating write address WA and read address RA of the small amount memories 12a, 12b based on strobe signal S2 and high speed clock CLK, reference numeral 20 denotes a selector into which write address WA and read address RA output from the address generating unit 19 are input. The selector 20 outputs write address WA to the small amount memory 12a when select signal SEL is "H" level and outputs read address RA to the small amount memory 12a when select signal SEL is "L" level. Reference numeral 21 denotes a selector into which write address WA and read address RA output from the address generating unit 19 are input. The selector 21 outputs read address RA to the small amount memory 12b when select signal SEL is "H" level and outputs write address WA to the small amount memory 12b when select signal SEL is "L" level. Write address WA is generated in synchronism with strobe signal S2 and read address RA is generated in synchronism with high speed clock CLK at the address generating unit 19.

Signals T2 to be traced, including address bus signals, data bus signals and control signals of the target CPU 11 are provided to both of the small amount memories 12a and 12b. Strobe signal S2 output from the target CPU 11 is provided to the small amount memory controlling circuit 15, the write signal generating unit 18 and the address generating unit 19. Select signal SEL output from the small amount memory controlling circuit 15 is provided to the small amount memories 12a, 12b, selectors 13, 20, 21, and DRAM controlling circuit 17 via control terminals thereof. A signal input to the control terminal of the small amount memory 12a is inverted. Strobe signal S2 and asynchronous high speed clock CLK are provided to the counter 16, the DRAM controlling circuit 17 and the address generating circuit 19. The counter 16 generates address signal AD for the DRAM 14 based on an input clock signal and provides address signal AD to the DRAM 14. The DRAM controlling circuit 17 provides row address strobe signal RAS and column address strobe signal CAS to the DRAM 14.

Figure 2:
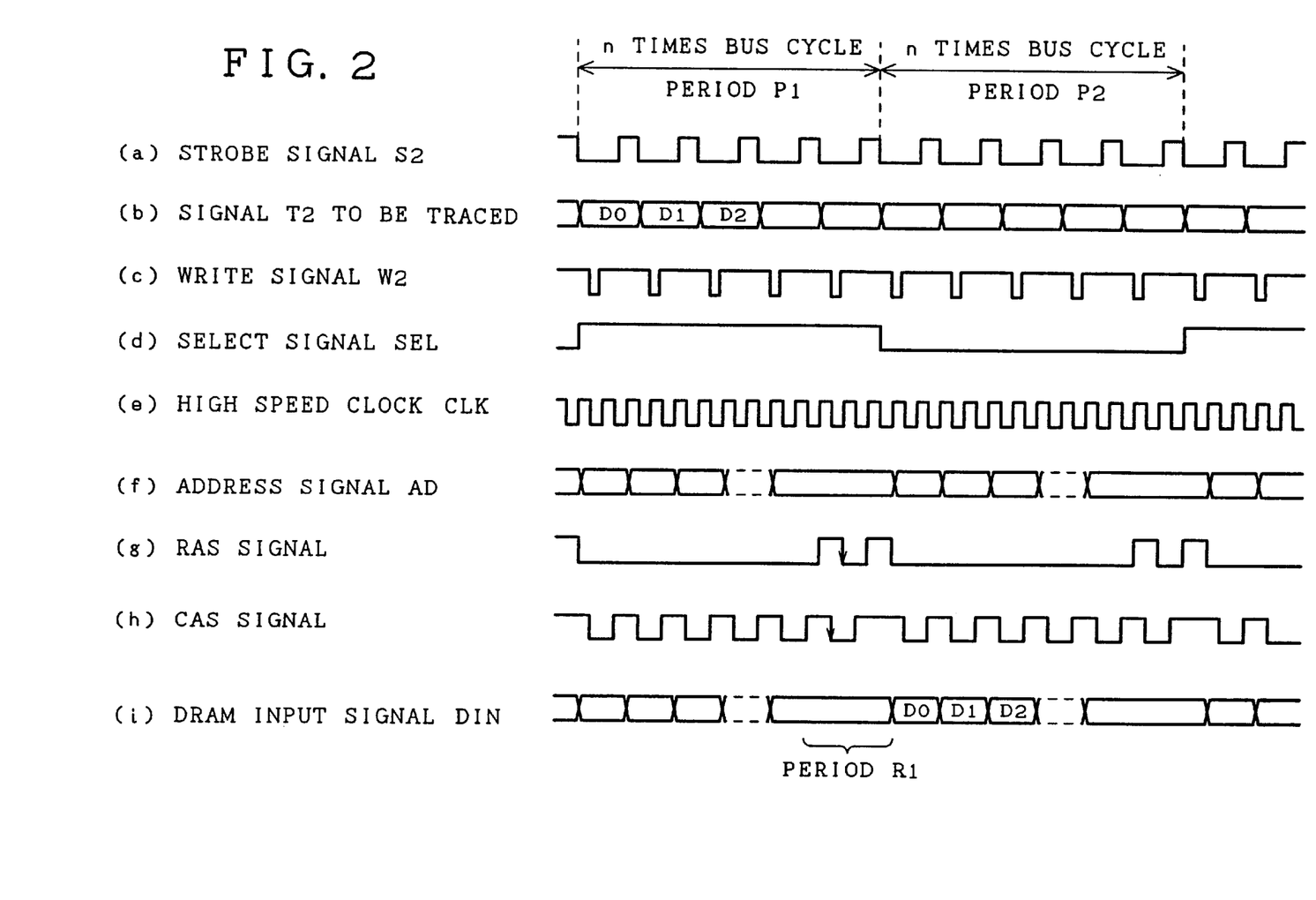
FIG. 2 is a timing chart showing timings of the signals of the data tracing apparatus indicated in FIG. 1.

FIG. 2 is a timing chart showing timing of the signals of the data tracing apparatus indicated in FIG. 1. At first, operations during the period P1 indicated in FIG. 2 will be explained. The target CPU 11 executes a user program which is the subject of debugging and performs bus cycle operations to memories and I/O devices. A bus cycle operation is recognized by referring to strobe signal S2. Each time strobe signal S2 becomes active, i.e., at the trailing edges of strobe signal S2, a bus cycle operation of the target CPU 11 is performed. The small amount memory controlling circuit 15 counts bus cycles and generates select signal SEL whose level is alternatively changed between "H" and "L" every n bus cycles (n is a natural number) and outputs select signal SEL to the control terminals of the small amount memories 12a, 12b, selectors 13, 20, 21 and the DRAM controlling circuit 17. While select signal SEL is "H", e.g., during the period P1 indicated in FIG. 2, data of signal T2 to be traced concerning the target CPU 11 for n bus cycles are stored in the small amount memory 12a. The write signal generating unit 18 generates write signal W2 based on strobe signal S2 and provides write signal W2 to the small amount memories 12a, 12b. Each time write signal W2 becomes "L", data of signal T2 to be traced are written in an area at write address WA transferred from the selector 20 in the small amount memory 12a.

On the other hand, when select signal SEL changes to "H" from "L", a reading operation of the data of signal T2 to be traced previously stored in the small amount memory 12b is performed. Namely, the data at read address RA output from the selector 21 are successively transferred via the selector 13 to the DRAM 14. When the select signal SEL is "H", the selector 13 selects an output signal from the small amount memory 12b and provides the selected signal to the DRAM 14. On the other hand, when the select signal SEL is "L", the selector 13 selects an output signal from the small amount memory 12a and provides the selected signal to the DRAM 14. Read address RA is generated by the address generating unit 19 based on high speed clock CLK such that read address RA is faster than strobe signal S2. Therefore, reading out of data in the small amount memory 12b is performed faster than the writing of data into the memory 12b.

On the other hand, the writing operation to the DRAM 14 of the data transferred via the selector 13 from the small amount memory 12b is performed in the following manner. While writing data to the DRAM 14, when the level of the select signal SEL is changed to "H" from "L", the DRAM controlling circuit 17 changes the level of row address strobe signal RAS to "L", i.e., makes row address strobe signal RAS active. Then, the DRAM controlling circuit 17 makes column address signal CAS active n times, i.e., changes the level of the column address strobe signal CAS from "H" to "L" n times. The counter 16 generates address signal AD which increases by one in response to high speed clock CLK and provides address signal AD to the DRAM 14. Therefore, the data to be traced output from the small amount memory 12b is successively stored at the address AD output from the counter 16 in the DRAM 14.

The DRAM controlling circuit 17 makes column address strobe signal CAS active n times. Thereafter, the DRAM controlling circuit 17 makes row address strobe signal RAS inactive, i.e., makes the signal RAS "H" to complete the data writing operation to the DRAM 14.

Next, the DRAM controlling circuit 17 generates column address strobe signal CAS and row address strobe signal RAS such that the DRAM 14 performs refreshing operation. Namely, as shown in FIG. 2, the DRAM controlling circuit 17 changes column address strobe signal CAS to "L" from "H" during the period R1, thereafter changes row address strobe signal RAS "L" from "H" in order to perform a CAS before RAS to refreshing operation. The time period required for storing data to be traced in the small amount memory 12a is longer than the time required for reading out the data to be traced. By taking advantage of this time difference, the refreshing operation to the DRAM 14 is performed. In this embodiment, a CAS before RAS refreshing operation is adopted. However, other method for refreshing the DRAM 14 may be used.

Next, the operations in the period P2 will be explained. After the data to be traced concerning the target CPU 11 for n bus cycles are stored in the small amount memory 12a, select signal SEL is changed from "H" to "L". While select signal SEL is "L", i.e., during the period P2 indicated in FIG. 2, the data to be traced concerning the target CPU 11 is stored in the small amount memory 12b and the data to be traced previously stored in the small amount memory 12a are output. Namely, when the select signal is "L", the selector 13 selects data output from the small amount memory 12a and outputs the selected data to the DRAM 14. The selector 20 outputs read address RA to the small amount memory 12a and the selector 21 outputs write address WA to the small amount memory 12b. Therefore the, reading out operation of the data stored in the small amount memory 12a is performed in the same manner as the reading out operation of the data stored in the small amount memory 12b in the period P1 as explained above. Further, the writing operation of the data to the small amount memory 12b is performed in the same manner as the writing operation of the data to the small amount memory 12a in the period P1 as explained above. Therefore, the data D0, D1, D2, . . . of the signal T2 to be traced which are written in the period P1 indicated by (b) of FIG. 2 are read out to the DRAM 14 as a DRAM input signal DIN as the period P2 starts.

The level of select signal SEL is changed between "H" and "L" repeatedly. By repeatedly changing the level of signal SEL, the operations in the period P1 and the operations in the period P2 are repeated, and the data of signal T2 to be traced are successively stored in the DRAM 14. Even though a time difference occurs between the generation of the bus cycle of the target CPU 11 and the transfer of the data to the DRAM 14, the data of the signal T2 to be traced are stored in the DRAM 14 in the order of the occurrences of the bus cycles. Further, during the time period obtained due to the fact that reading out of the data of the small amount memories 12a and 12b is performed faster than the writing of the data to these memories, refreshing operation to the DRAM 14 is performed. Therefore, a DRAM which is cheaper and smaller may be used as a memory for storing data to be traced, and a smaller sized data tracing apparatus may be produced at a lower cost.

EMBODIMENT 2

Figure 3:
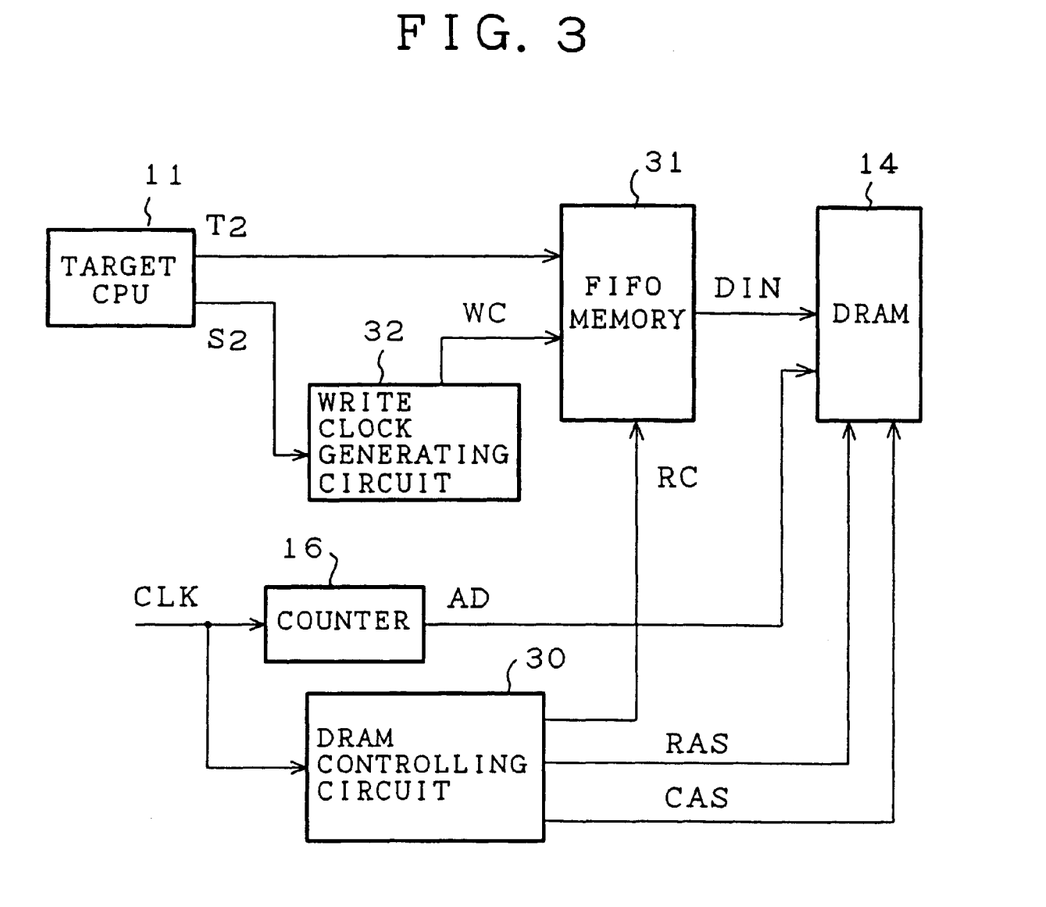
FIG. 3 is a block diagram showing a configuration of the data tracing apparatus according to the second embodiment of the present invention.

FIG. 3 is a block diagram showing a configuration of the data tracing apparatus according to the second embodiment of the present invention. The same reference numerals are attached to the same portions as those indicated in FIG. 1 in order to eliminate the duplicate explanations. In FIG. 3, reference numeral 30 denotes a DRAM controlling circuit which controls the DRAM 14, reference numeral 31 denotes a First In First Out (FIFO) memory for storing data of the signal T2 to be traced concerning the target CPU 11 and for outputting the data to the DRAM 14 as DRAM input signal DIN, reference numeral 32 denotes a write clock generating circuit which generates write clock WC for determining timing of writing operation to the FIFO memory 31. The DRAM controlling circuit 30 generates row address strobe signal RAS and column address strobe signal CAS as explained in the first embodiment and provides these signals to the DRAM 14. The DRAM controlling circuit 30 also generates read clock RC for determining read out timing of data stored in the FIFO memory 31 and provides the clock to the FIFO memory 31.

Figure 4:
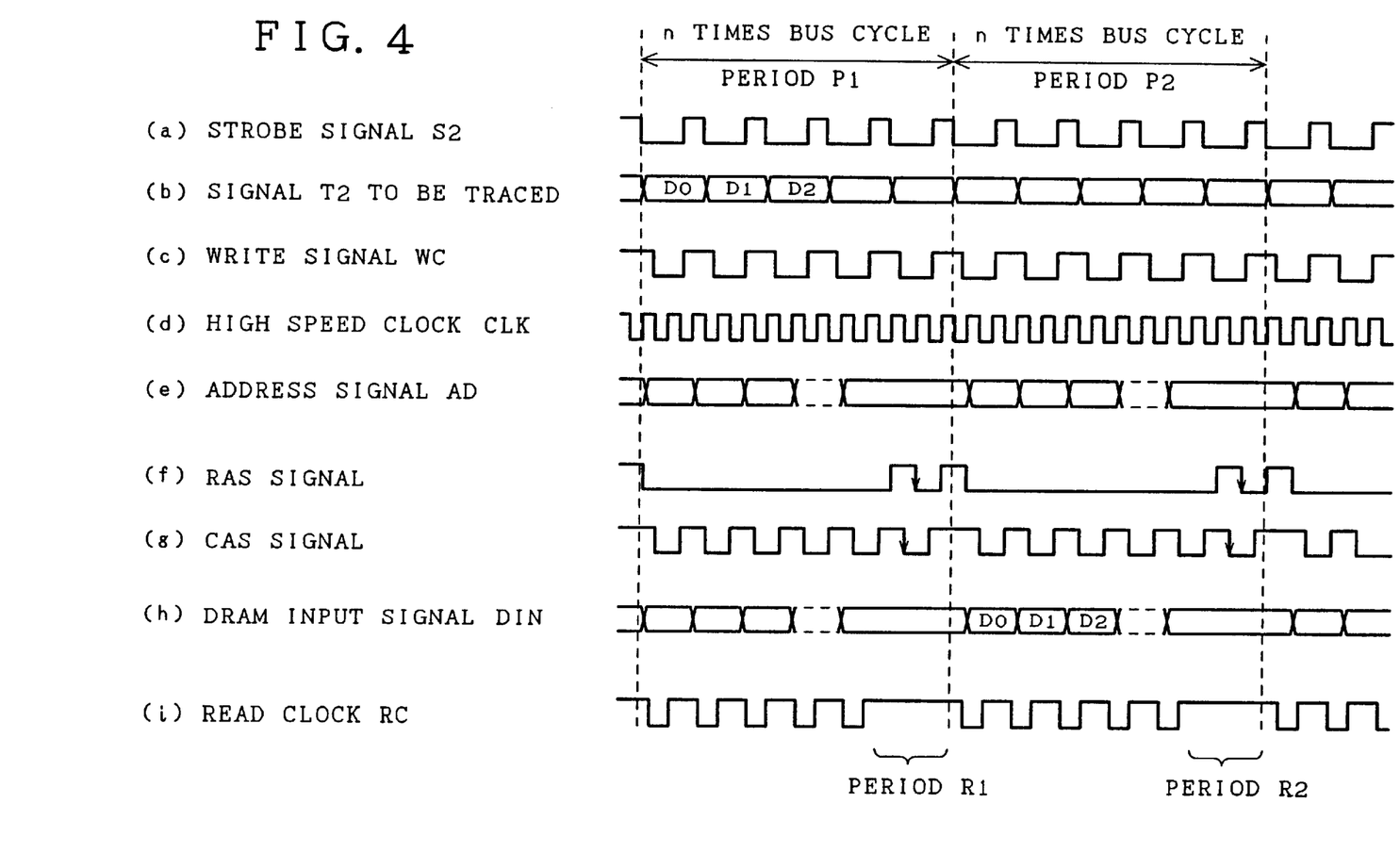
FIG. 4 is a timing chart showing timing of the signals in the data tracing apparatus indicated in FIG. 3.

FIG. 4 is a timing chart showing timing of the signals in the data tracing apparatus indicated in FIG. 3. As explained in the first embodiment, the target CPU 11 executes a user program which is the subject of debugging to perform the bus cycle operations to a memory and I/O devices. The write clock generating unit 32 generates write clock WC in synchronism with strobe signal S2 and provides the clock to the FIFO memory 31. At each trailing edge of write clock WC, data of signal T2 to be traced are written in the FIFO memory 31.

The DRAM controlling circuit 30 makes read clock RC "L" n times while n bus cycle operations are performed (n is a natural number). The FIFO memory 31 outputs data stored therein at each trailing edge of read clock RC to the DRAM 14 where the data are input as DRAM input signal DIN. Read clock RC is faster than write clock WC thereby surplus period R1 is obtained. In this surplus period R1, refreshing operation to the DRAM 14 such as a CAS before RAS refreshing method as explained in the first embodiment is performed. Namely, in this embodiment, writing operations and reading operations are performed for the FIFO memory 31 at the same time, and the reading operation is performed faster than the writing operation. The surplus period can be used for refreshing the DRAM 14. Therefore, for example, the data D0, D1, D2, . . . of signal T2 to be traced which is written during the period P1 are read out from the FIFO memory 31 during the period P2 and are input and stored to the DRAM 14 as DRAM input signal DIN. As explained above, continuous data of signal T2 to be traced are stored in the DRAM 14 in the order of the occurrence.

It should be noted that the number n of bus cycles should be set to be less than half the depth, i.e., half the number of words, of the FIFO memory 31 in order that all of the data of the signal T2 to be traced for each bus cycle concerning the target CPU 11 are stored in DRAM 14 without losing any data.

Therefore, a DRAM which is cheaper and smaller may be used as a memory for storing data to be traced, and a smaller sized data tracing apparatus may be produced at a lower cost.

What is claimed is:

1. A data tracing apparatus for successively storing trace data concerning execution of a program by a target microcomputer for each bus cycle, the apparatus comprising:

data storing means having a first memory area and a second memory area for storing trace data concerning operations of a target microcomputer in executing a program to be debugged, each of the first and second memory areas storing trace data corresponding to n bus cycles, n being a natural number;

data writing/reading controlling means for, during a first time period, writing trace data to the first memory area and reading trace data from the second memory area for n bus cycles and for, during a second time period, after the first time period, reading trace data stored in the first memory area and writing trace data to the second memory area for n bus cycles, the reading being faster than the writing;

a dynamic memory for successively storing trace data read from the data storing means by the data writing/reading controlling means; and refreshing means for refreshing the dynamic memory after reading by the data writing/reading controlling means.

2. The data tracing apparatus according to claim 1, wherein the data storing means includes a first memory corresponding to the first memory area and a second memory corresponding to the second memory area, and wherein the data writing/reading controlling means has a selector, receiving an output signal from the first memory and an output signal from the second memory, for selecting the output signal from the first memory and the second memory subject to reading and for outputting the selected signal to the dynamic memory.

3. The data tracing apparatus according to claim 2, wherein the first memory and the second memory each comprise a static memory.

4. A data tracing apparatus comprising:

a target microcomputer for executing a program to be debugged and for outputting trace data concerning operations of the target microcomputer in executing the program;

a first-in first-out memory coupled to the target microcomputer for storing trace data;

data writing/reading controlling means for writing trace data to the first-in first-out memory and for reading trace data from the first-in first-out memory for n bus cycles, n being a natural number, the reading being faster than the writing;

a dynamic memory for successively storing trace data read from the first-in first-out memory by the data writing/reading controlling means; and refreshing means for refreshing the dynamic memory after reading by the data writing/reading controlling means.

5. The data tracing apparatus according to claim 1 comprising a target microcomputer coupled to the data storing means for executing the program to be debugged and for outputting trace data concerning the operations of the target microcomputer in executing the program.

* * * * *

UNITED STATES PATENT AND TRADEMARK OFFICE
CERTIFICATE OF CORRECTION

PATENT NO. : 5,897,653
DATED : April 27, 1999
INVENTOR(S) : Naohisa Tashima

It is certified that error appears in the above-identified patent and that said Letters Patent is hereby corrected as shown below:

Title page,
Under Item [73], Assignees, after "Software" insert -- Co., Ltd. --.

Signed and Sealed this

Twenty-sixth Day of March, 2002

Attest:

Attesting Officer

JAMES E. ROGAN
Director of the United States Patent and Trademark Office